(12) United States Patent
Ashley (10) Patent No.: US 10,731,528 B2
(45) Date of Patent: Aug. 4, 2020

(54) LOCKING PLUG MECHANISMS THAT SEAL OPENINGS OF TUBE STRUCTURES AND METHODS OF SEALING OPENINGS OF THE STRUCTURES

(71) Applicant: Toyota Motor Engineering & Manufacturing North America, inc., Erlanger, KY (US)

(72) Inventor: Matthew S. Ashley, Dunbar, WV (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 212 days.

(21) Appl. No.: 15/891,796

(22) Filed: Feb. 8, 2018

(65) Prior Publication Data
US 2019/0242280 A1   Aug. 8, 2019

(51) Int. Cl.
F01M 11/12   (2006.01)
G01F 23/04   (2006.01)

(52) U.S. Cl.
CPC ............. *F01M 11/12* (2013.01); *G01F 23/04* (2013.01)

(58) Field of Classification Search
CPC ................................. F01M 11/12; G01F 23/04
USPC ................................................... 33/728, 731
See application file for complete search history.

(56) References Cited

U.S. PATENT DOCUMENTS

| | | | | |
|---|---|---|---|---|
| 2,479,862 A * | 8/1949 | Payne | ................... | F16L 55/132 215/359 |
| 3,130,571 A * | 4/1964 | Neumann | .......... | A63B 37/0001 70/58 |
| 3,349,944 A * | 10/1967 | Moeller | ................... | G01F 23/04 184/109 |
| 3,371,418 A | 3/1968 | Moeller | | |
| 4,035,921 A * | 7/1977 | Williams | ........... | B60K 15/0409 33/728 |
| 5,086,943 A * | 2/1992 | Poskie | ............... | B65D 51/1622 220/303 |

(Continued)

FOREIGN PATENT DOCUMENTS

| | | |
|---|---|---|
| JP | 2013053603 | 5/2015 |
| JP | 2014148922 | 6/2017 |

OTHER PUBLICATIONS

"SCA Tubeless Tyre Valve—Plastic, Long Stem, 2 Piece" http://www.supercheapauto.com.au/Product/SCA-Tubeless-Tyre-Valve-Plastic-Long-Stem-2-Piece/342043? Published/Accessed: Nov. 24, 2017.

(Continued)

*Primary Examiner* — Christopher W Fulton
(74) *Attorney, Agent, or Firm* — Dinsmore & Shohl LLP (57) ABSTRACT

A locking plug mechanism includes a handle assembly that includes a handle body that is pivotally connected to a handle attachment member. A center pin member is connected to the handle attachment member. The center pin member is slidably received within an opening of a proximal spacer member comprising a proximal spacer located proximally on the center pin member. A distal spacer is located on the center pin member. A seal member is located on the center pin member between the proximal spacer and the distal spacer. The actuation of the handle assembly moves the center pin member relative to the proximal spacer and expands the seal member from a collapsed configuration to an expanded configuration.

19 Claims, 10 Drawing Sheets

(56) References Cited

U.S. PATENT DOCUMENTS

| | | | | |
|---|---|---|---|---|
| 5,613,303 | A * | 3/1997 | Kayano | G01F 23/04 |
| | | | | 33/722 |
| 5,829,153 | A * | 11/1998 | Hitchock | G01F 23/04 |
| | | | | 33/728 |
| 6,419,104 | B1 * | 7/2002 | Sarajian | B05B 12/26 |
| | | | | 220/234 |
| 6,883,546 | B1 * | 4/2005 | Kobylinski | F16L 55/1141 |
| | | | | 138/89 |
| 7,694,430 | B1 * | 4/2010 | Groot | G01F 23/04 |
| | | | | 33/728 |
| 8,186,074 | B2 | 5/2012 | Hart et al. | |
| 8,230,889 | B2 | 7/2012 | Pratt et al. | |
| 8,764,767 | B2 | 7/2014 | Barker | |

OTHER PUBLICATIONS

"Hand Tightening Aluminum Body Test Plugs With By-Pass Sizes: 1.5" to 12", 149-1 Series" URL: https://www.petersenproducts.com/149-1-Series-Aluminum-Body-Test-By-Pass-Plugs-s/1913.htm Published/Accessed: Nov. 24, 2017.

* cited by examiner

LOCKING PLUG MECHANISMS THAT SEAL OPENINGS OF TUBE STRUCTURES AND METHODS OF SEALING OPENINGS OF THE STRUCTURES

TECHNICAL FIELD

The present specification generally relates to plug mechanisms, and more specifically, locking plug mechanisms that seal openings of tube structures and methods of sealing openings of tube structures using locking plug mechanisms.

BACKGROUND

Vehicle engines include many moving parts. Those moving marts may generally require a lubricating fluid, such as an oil to operate effectively. Many engines have an oil reservoir associated therewith. The oil reservoir holds the oil and allows oil to be pumped into the engine through an oil pathway network.

Over time, it is not unusual for oil levels within the oil reservoir to decrease and also for the oil to need to be replaced. Many vehicles include an oil level gage, sometimes referred to as a dipstick that can be inserted into the oil reservoir through an oil level gage guide in order to test the oil level within the oil reservoir.

In some instances, such as during engine pressure testing, it may be desirable to pressurize the oil pathway network to detect possible leaks, which includes the oil reservoir. Because the oil level gage guide is in fluid communication with the oil reservoir, the oil level gage guide may also be pressurized.

What is desired are locking plug mechanisms that seal openings of tube structures and methods of sealing openings of tube structures using locking plug mechanisms.

SUMMARY

In one embodiment, a locking plug mechanism includes a handle assembly that includes a handle body that is pivotally connected to a handle attachment member. A center pin member is connected to the handle attachment member. The center pin member is slidably received within an opening of a proximal spacer member comprising a proximal spacer located proximally on the center pin member. A distal spacer is located on the center pin member. A seal member is located on the center pin member between the proximal spacer and the distal spacer. The actuation of the handle assembly moves the center pin member relative to the proximal spacer and expands the seal member from a collapsed configuration to an expanded configuration.

In another embodiment, a method of sealing a tube structure using a locking plug mechanism is provided. The method includes inserting a center pin member into the tube structure. The center pin member is slidably received within an opening of a proximal spacer member that includes a proximal spacer located proximally on the center pin member. A width of a seal member located on the center pin member between the proximal spacer and a distal spacer is expanded by actuating a handle assembly thereby moving the center pin member relative to the proximal spacer.

In another embodiment, a locking plug mechanism that seals an oil level gage guide includes a handle assembly that includes a handle body that is pivotally connected to a handle attachment member. A center pin member is connected to the handle attachment member. The center pin member is slidably received within an opening of a proximal spacer member that includes a proximal spacer located proximally on the center pin member. The center pin member includes a center pin that is sized to be received within the oil level gage guide. A distal spacer is located on the center pin member. An expandable seal member is located on the center pin member between the proximal spacer and the distal spacer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present specification is generally directed to locking plug mechanisms that seal openings of tube structures and methods of sealing openings of tube structures using locking plug mechanisms. Vehicles, for example, include many tube structures at various places in the vehicle used for various purposes. One such tube structure may be an oil level gage guide that is used to guide an oil level gage to an oil reservoir. The oil level gage includes a graspable portion and a stick portion that extends away from the handle portion to a free end. The stick portion may be resiliently flexible to facilitate insertion into and through the oil level gage guide to the oil reservoir.

The oil level gage guide is in fluid communication with the oil reservoir. Under engine pressure testing conditions, it may be desirable to seal the oil level gage guide in order to prevent depressurization and receive more reliable results. To this end, the locking plug mechanisms include an insertion portion that is sized to be inserted into the oil level gage guide and a handle portion that can be actuated by a user. The insertion portion includes an expandable seal member having an expanded configuration of increased width or diameter and a collapsed configuration of reduced width or diameter. Actuation of the handle portion places the expandable seal member in either the expanded configuration of increased width dimension or the collapsed configuration of decreased width dimension.

Figure 1:
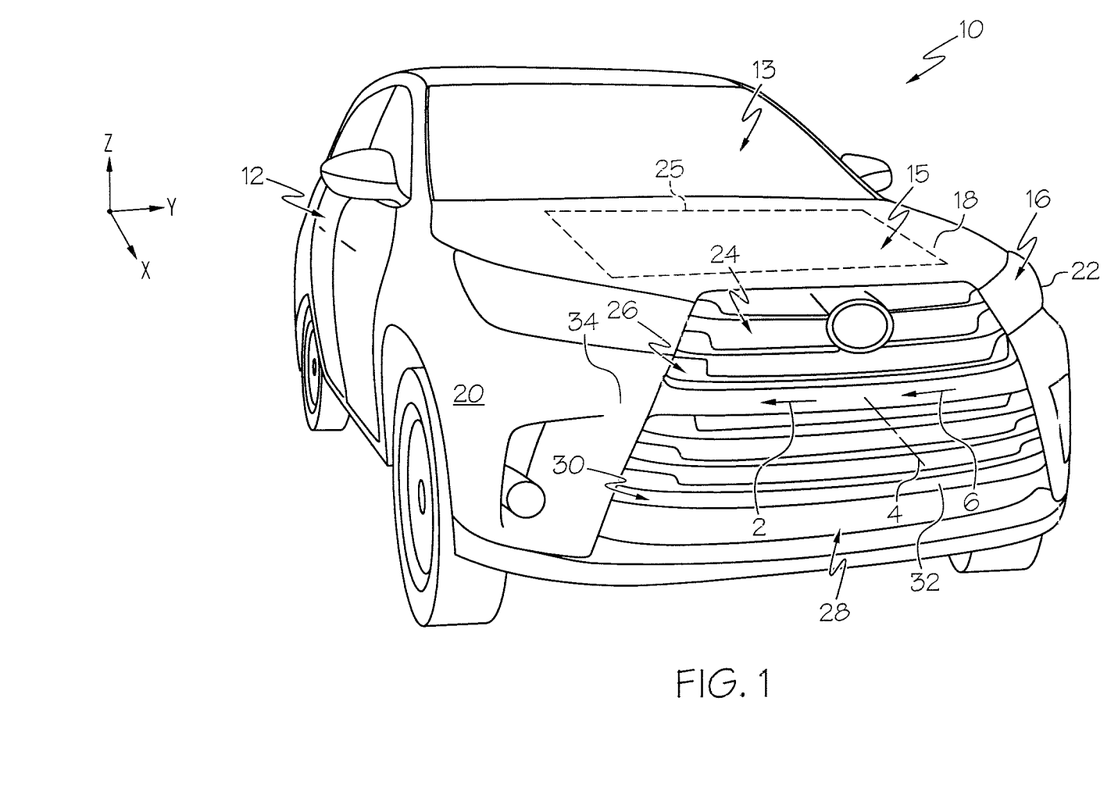
FIG. 1 illustrates a perspective view of a vehicle, according to one or more embodiments shown or described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology.

Referring initially to FIG. 1, a vehicle 10 is depicted. The vehicle 10 includes a body 12 onto which a vehicle drivetrain is coupled. The vehicle 10 also includes a cabin 13 that is integral with the body 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. The hood 18 covers an engine compartment 15 where an engine assembly 25 is housed. Generally, the upper grille assembly 24 and lower grille assembly 28 include a covering portion 30 with a number of horizontally disposed grille deflectors 32, a mesh or other suitable covering that protects a radiator behind the covering portion 30, while allowing air to flow past the covering and over the radiator. The front end assembly 16 includes an outer covering or front fascia 34 that covers various front components of the vehicle 10.

Figure 2:
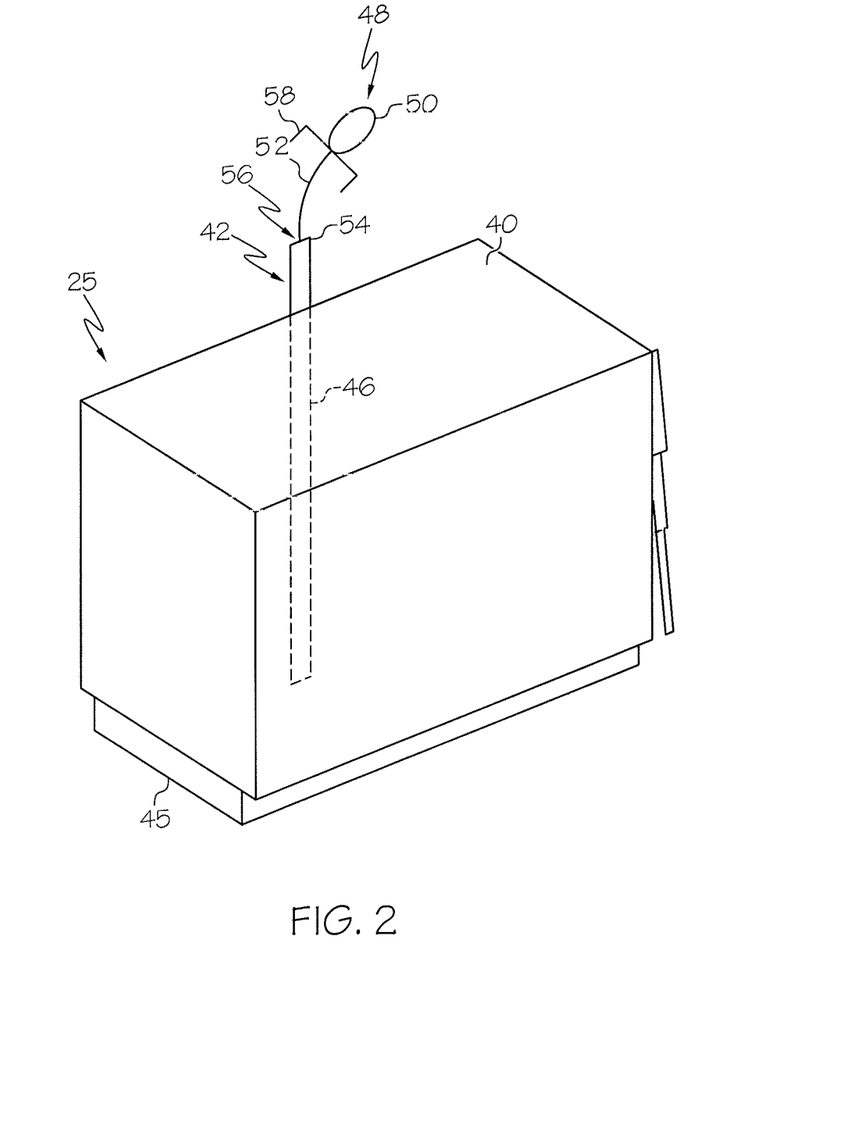
FIG. 2 is a schematic view of an engine assembly of use with the vehicle of FIG. 1, according to one or more embodiments shown and described herein.

Referring briefly to FIG. 2, a schematic view of the engine assembly 25 is shown that includes an engine block 40 and an oil pan 45 that is connected to the engine block 40. An oil level gage guide 42 (i.e., an oil dipstick tube) is connected to the engine assembly 25 that provides access to the oil pan 45. The oil level gage guide 42 is connected to the engine assembly 25 for communication with an oil level gage guide pathway 46 to an interior of the oil pan 45. In some embodiments, the oil level gage guide 42 may provide the oil level gage guide pathway 46, itself, to the interior of the oil pan 45, thereby bypassing the engine block 40 or the oil level gage guide pathway 46 may at least partially pass through the engine block or some other structure to the oil pan 45.

An oil level gage 48 may be connected to the oil level gage guide 42. The oil level gage 48 may include a graspable portion 50 and a stick portion 52 that extends outwardly from the graspable portion 50 to a free end. In the example of FIG. 2, the oil level gage 48 is illustrated as pulled partially outwardly from the oil level gage guide 42 thereby exposing an upper rim 54 and opening 56. The graspable portion 50 may include a cap structure 58 that can seal against and engage the upper rim 54 of the oil level gage guide 42.

Figure 3:
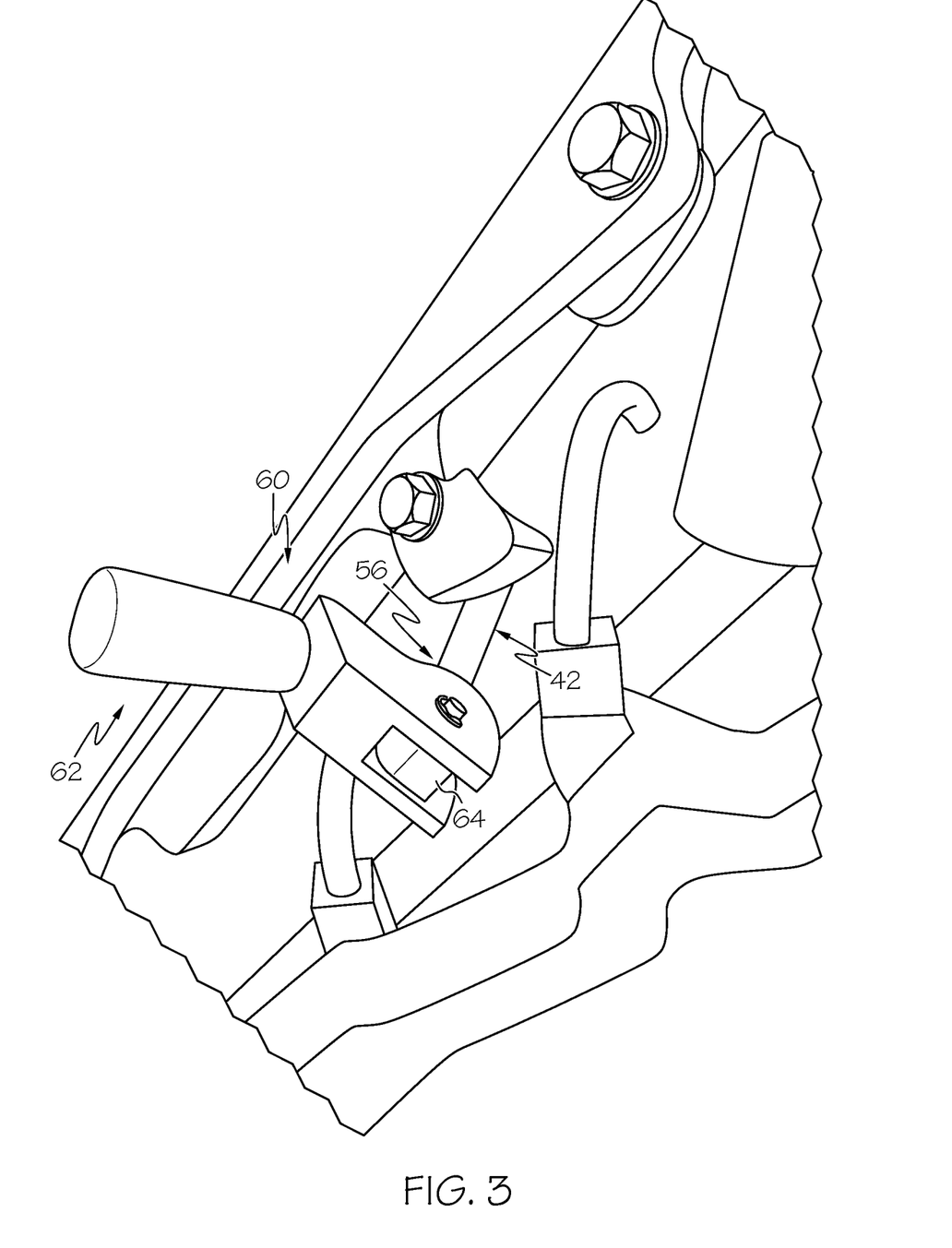
FIG. 3 is a perspective view of a locking plug mechanism connected to an oil level gage guide, according to one or more embodiments shown and described herein.

Referring now to FIG. 3, under pressure testing conditions, it may be desirable to plug the opening 56 of the oil level gage guide 42 with a locking plug mechanism 60. In the example of FIG. 3, the locking plug mechanism 60 is connected to the oil level gage guide 42 in order to seal the oil level gage guide 42 such that fluid does not escape therefrom thereby affecting testing results. As will be described in greater detail below, the locking plug mechanism 60 includes a handle portion 62 that can be manually actuated by a user. The handle portion 62 rotates or otherwise moves relative to a handle attachment member 64 to place the locking plug mechanism 60 in the illustrated expanded configuration that seals against an inner wall of the oil level gage guide 42.

Figure 4:
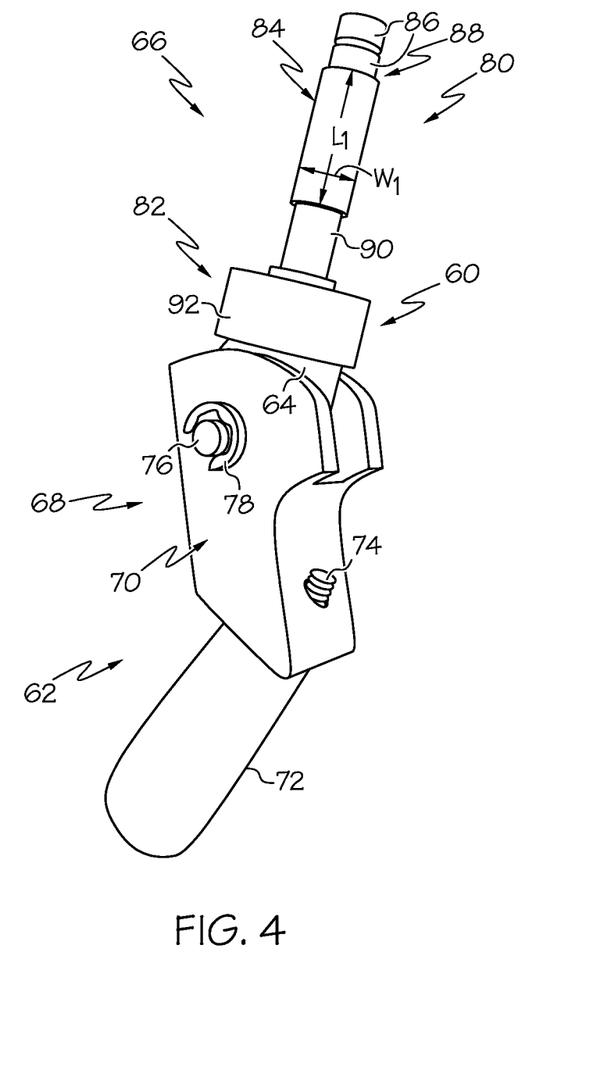
FIG. 4 is a perspective view of the locking plug mechanism of FIG. 3 in isolation and in a collapsed configuration, according to one or more embodiment shown and described herein.

Referring to FIG. 4, the locking plug mechanism 60 is illustrated in isolation and includes the handle portion 62 and an insertion portion 66. The handle portion 62 includes a handle assembly 68 including a handle body 70 and a handle member 72 that is connected to the handle body 70. In some embodiments, the handle member 72 may include a connector 74 (e.g., a threaded fastener) that removable connects the handle member 72 to the handle body 70. In other embodiments, the handle member 72 may be connected to the handle body 70 using any suitable connection, such as adhesives, welding, etc.

The handle body 70 is rotatably connected to the handle attachment member 64 (FIG. 3). The handle body 70 may be rotatably connected to the handle attachment member 64 using an attachment pin 76 that provides an axis of rotation for the handle body 70 to rotate relative to the handle attachment member 64. A locking member 78 may be used to releasably lock the attachment pin 76 in place. However, in other embodiments, other suitable connections, such as welding, adhesives, etc. may be used.

The insertion portion 66 includes a center pin member 80 and an upper spacer member 82. The center pin member 80 slidably passes through the proximal spacer member and is attached to the handle attachment member 64. A seal member 84 is located about the center pin member 80. The seal member 84 is sandwiched between a distal spacer 86 that is attached to an end 88 of the center pin member 80 and an proximal spacer 90 that is connected to a spacer body 92 of the upper spacer member 82.

Figure 5:
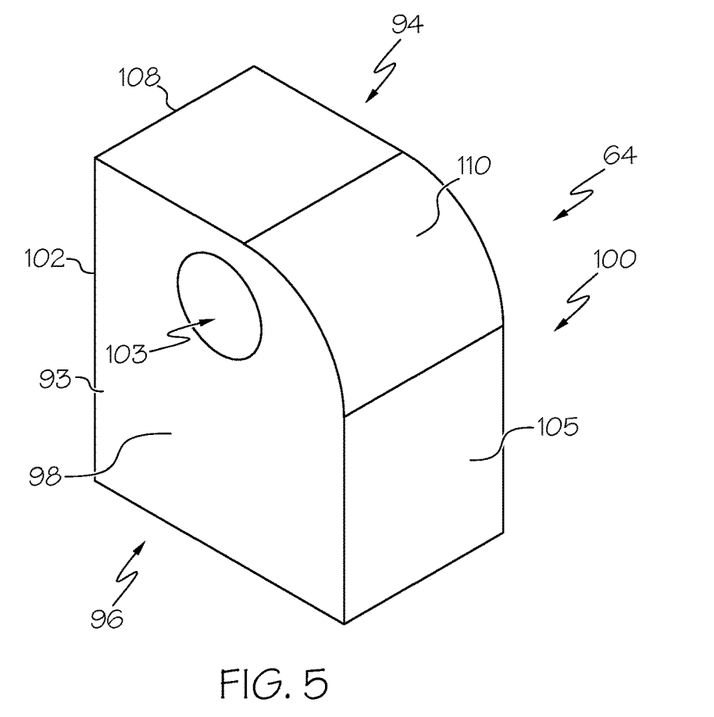
FIG. 5 is a perspective vie of a handle attachment member of the locking plug mechanism of FIG. 4, according to one or more embodiments shown and described herein.
Figure 6:
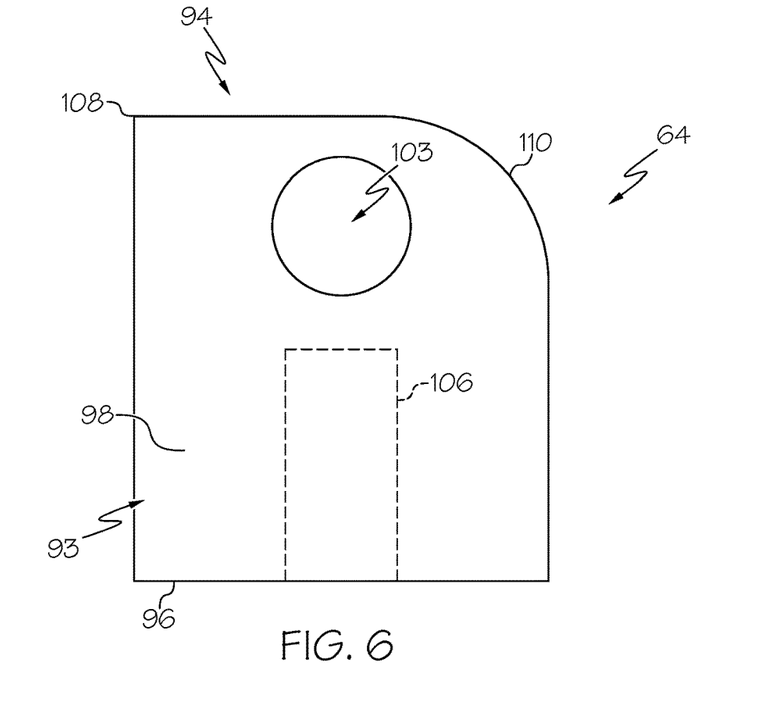
FIG. 6 is a side view of the handle attachment member of FIG. 5.

FIGS. 5 and 6 illustrate the handle attachment member 64 in isolation. The handle attachment member 64 includes a handle attachment body 93 having an upper end 94, a lower end 96, side faces 98 and 100, and side ends 102 and 105 that extend between the upper end 94 and the lower end 96. Extending through the side faces 98 and 100 is an opening 103 that slidably receives the attachment pin 76. Extending from the lower end 96 toward the opening 103 is a pin receiving bore 106 that receives the center pin member 80 therein. The center pin member 80 may be fixedly received in the pin receiving bore 106 (e.g., through a threaded or any other suitable connection) such that the center pin member 80 moves with the handle attachment member 64. In some embodiments, the side end 102 and the upper end 94 may meet at a squared corner 108 and the side end 105 and the upper end 94 may meet at a rounded or chamfered corner 110. The rounded corner 110 may be provided to facilitate rotation of the handle attachment body 93 thereby to the expanded configuration. In some embodiments, the squared corner 108 may inhibit movement of the handle attachment body 93 thereby providing a stop.

Figure 7:
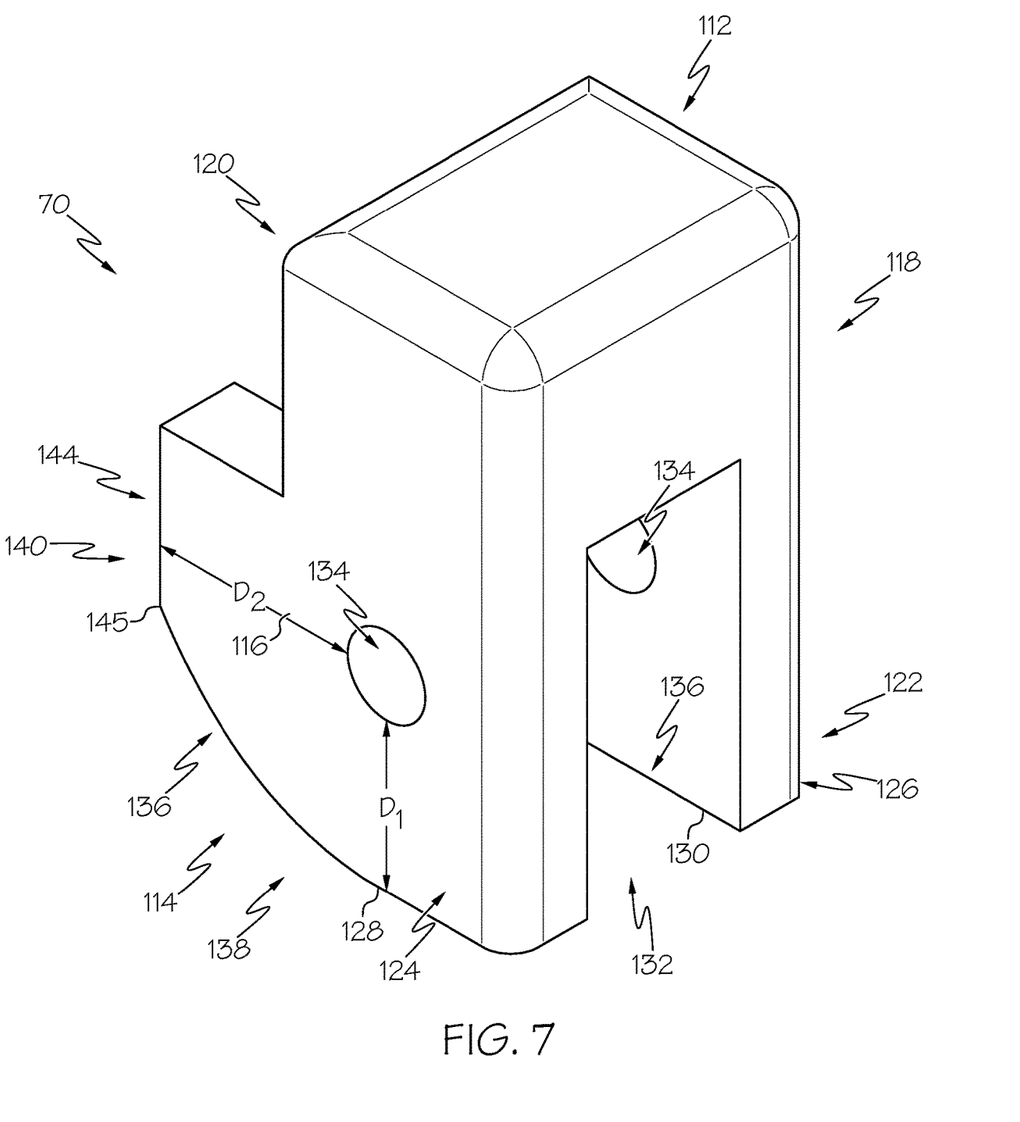
FIG. 7 is a perspective view of a handle body of the locking plug mechanism, according to one or more embodiments shown and described herein.

Referring to FIG. 7, the handle body 70 of the handle assembly 68 is illustrated in isolation. The handle body 70 has an upper end 112, a lower end 114, side faces 116 and 118, and side ends 120 and 122 that extend between the upper end 112 and the lower end 114. The side faces 116 and 118 are formed as part of leg structures 124 and 126 that extend outwardly away from the upper end 112 to attachment body contact edges 128 and 130. The leg structures 124 and 126 are also spaced-apart from one another to provide a channel 132 therebetween that receives the handle attachment member 64. Openings 134 are provided through the leg structures 124 and 126 that align with the opening 103 of the handle attachment body 93 such that the attachment pin 76 passes through the openings 103 and 134.

Each leg structure 124 and 126 includes a cam portion 136. The cam portions 136 are shaped to provide regions 138 and 140 of different distances $D_1$ and $D_2$ from the openings 134 to the attachment body contact edges 128 and 130, where $D_2$ is greater than $D_1$. As one example, $D_1$ may be a minimum distance to the attachment body contact edge 128, 130 and $D_2$ may be a maximum distance to the attachment body contact edge 128, 130. In some embodiments, the region 138 may have a relatively rounded profile, while the region 140 may have a flat portion 144. The flat portion 144 can provide a locking surface that can be used to lock the locking plug mechanism 60 in the expanded configuration using corner 145, which can provide resistance against rotation of the handle assembly 68 from the expanded configuration toward the collapsed configuration.

Figure 8:
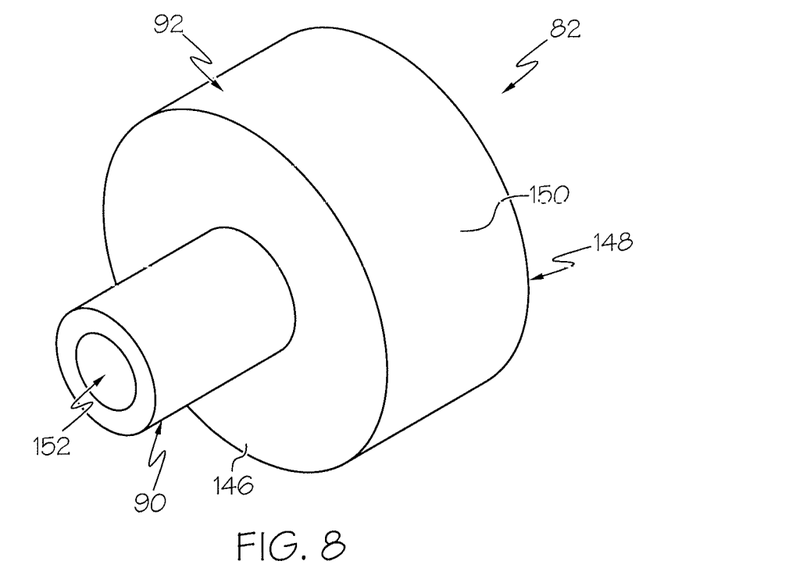
FIG. 8 is a perspective view of a proximal spacer member of the locking plug mechanism of FIG. 4, according to one or more embodiments shown and described herein.

Referring to FIG. 8, the proximal spacer member includes the spacer body 92 and the proximal spacer 90. While the spacer body 92 is illustrated as cylindrical and circular in cross-section, the spacer body any be any suitable cross-sectional shape, such polygonal or irregular. The proximal spacer member includes an upper face 148, a lower face 146 and a perimeter 150. The proximal spacer 90 extends outward from the lower face 146. The proximal spacer member has an opening 152 that extends through the proximal spacer 90 and the spacer body 92 that is sized to slidingly receive the center pin member 80 therethrough.

Figure 9:
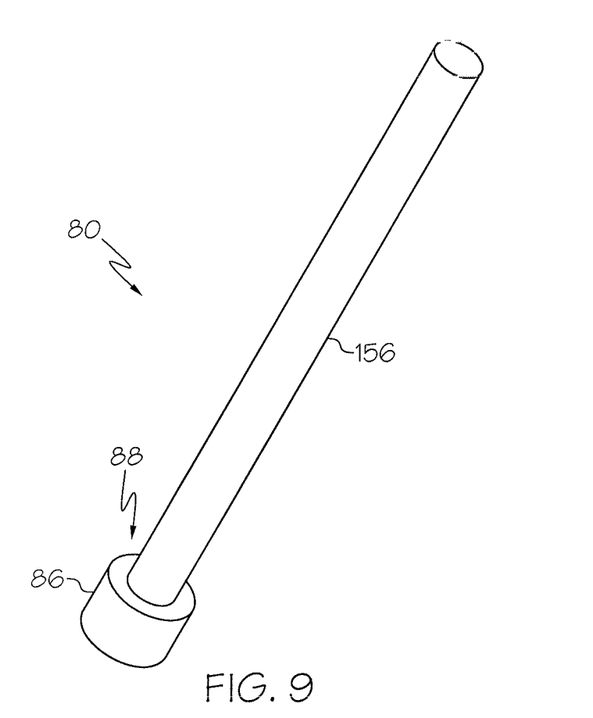
FIG. 9 is a perspective view of a center pin member of the locking plug mechanism of FIG. 4, according to one or more embodiments shown and described herein.

The center pin member 80 is illustrated by FIG. 9. The center pin member 80 includes a center pin 156 that may be circular in cross-sectional shape, or any other suitable shape, and the distal spacer 86 that is attached to an end 88 of the center pin 156. Any suitable method may be used to connect the distal spacer 86 to the center pin 156, such as fastening, welding, adhering, etc. The center pin 156 is shaped to be slidingly received by the opening 152 of the proximal spacer member and is connected to the handle attachment member 64, as discussed above.

Referring back to FIG. 4, the locking plug mechanism 60 is illustrated in the collapsed configuration. In the collapsed configuration, the regions 138 of the attachment body contact edges 128 and 130 are nearer the guide face 148 of the spacer body 92. In this arrangement, the lower end 96 of the handle attachment member 64 may engage the guide face 148 of the spacer body 92. In some embodiments, the guide face 148 of the spacer body 92 may engage the attachment body contact edges 128, 130 of the regions 138 with the locking plug mechanism 60 in the collapsed configuration.

The seal member 84 is formed of a resiliently flexible material, such as a rubber or plastic. The seal member 84 is sleeve or tube shaped, and positioned about the center pin 156. The outer diameters of the distal spacer 86 and the proximal spacer 90 are selected to be larger than the inner diameter of the seal member 84 to sandwich the seal member 84 therebetween and inhibit movement of the seal member 84 past the distal spacer 86 and the proximal spacer 90 during use. In the collapsed configuration, the distal spacer 86 of the center pin 156 is located relatively far from the proximal spacer 90, which allows a length $L_1$ of the seal member 84 to expand to a maximum length and a width or diameter $W_1$ of the seal member 84 to collapse to a minimum diameter.

Figure 10:
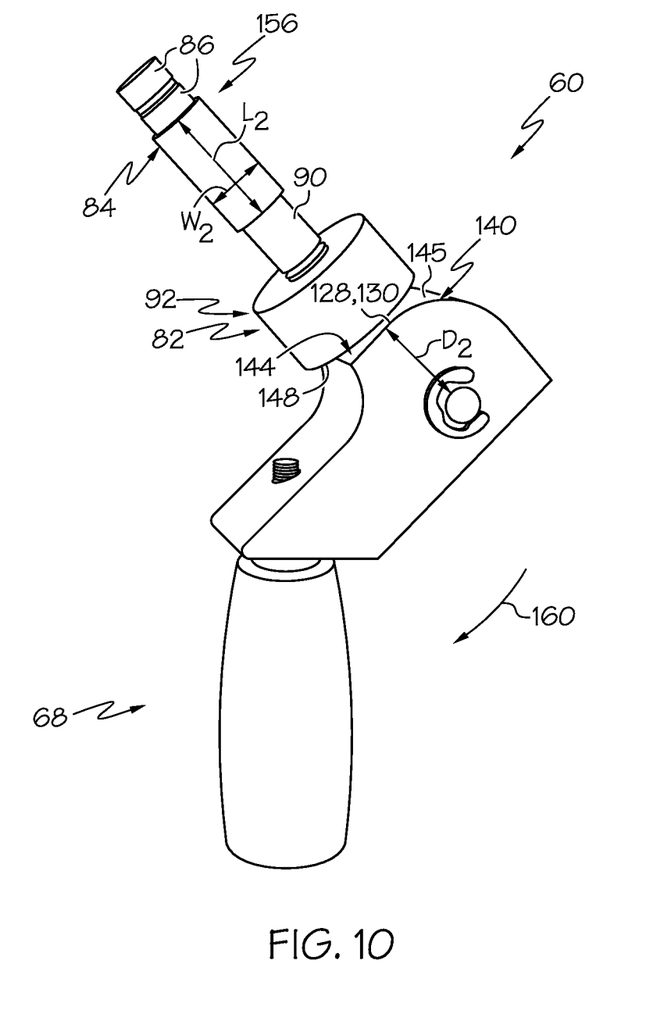
FIG. 10 is a perspective view of the locking plug mechanism of FIG. 4 in an expanded configuration, according to one or more embodiments shown and described herein.

Referring to FIG. 10, the locking plug mechanism 60 is illustrated in the expanded configuration. In the expanded configuration, the handle assembly 68 is rotated in the direction of arrow 160 and the regions 140 of the attachment body contact edges 128 and 130 are in contact with the guide face 148 of the spacer body 92. In this arrangement, handle attachment member 64 is moved away from the spacer body 92 of the proximal spacer memberdue to the increased distance $D_2$ from the openings 134 to the attachment body contact edges 128 and 130. This movement of the handle attachment member 65 (FIG. 4) away from the spacer body 92 draws the distal spacer 86 closer to the proximal spacer 90. In the expanded configuration, the distal spacer 86 of the center pin 156 is located relatively near from the proximal spacer 90 compared to the collapsed configuration, contracts the length of the seal member 84 to a length $L_2$ that is less than the length $L_1$ and expands a width or diameter $W_2$ of the seal member 84 to expand to a maximum diameter.

As noted above, the seal member 84 may be resilient and provide a biasing force to the handle assembly 68. However, the flat portion 144 and the corner 145 of the attachment body contact edge 128, 130 resists the tendency of the handle assembly 68 to rotate back toward the collapsed configuration until a manual force is applied to the handle assembly 68 in the direction opposite the arrow 160. Once the handle assembly 68 is rotated such that the corner clears the guide face 148 of the spacer body 92, the biasing force provided by the seal member 84 can move the handle assembly 68 back to the collapsed configuration.

Figure 11:
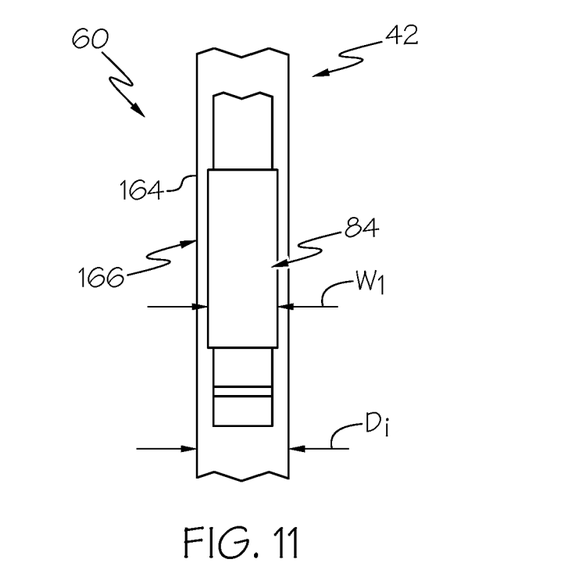
FIG. 11 is a schematic illustration of operation of the locking plug mechanism of FIG. 4, according to one or more embodiments shown and described herein.
Figure 12:
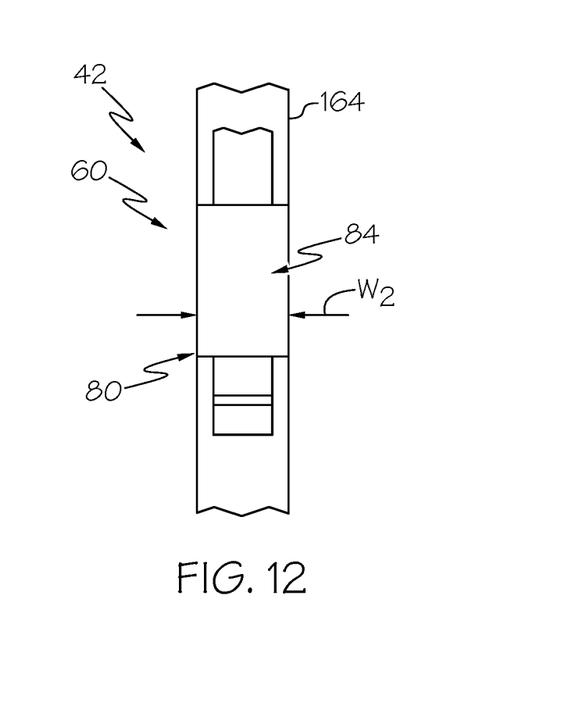
FIG. 12 is a schematic illustration of operation of the locking plug mechanism of FIG. 4, according to one or more embodiments shown and described herein.

FIGS. 11 and 12 illustrate further operation of the locking plug mechanism 60 and the seal member 84. Referring first to FIG. 11, the locking plug mechanism 60 is illustrated in the collapsed configuration with the width $W_1$ of the seal member 84 being less than an inner diameter $D_i$ of the oil level gage guide 42. In the collapsed configuration, the center pin member 80 including the seal member 84 can be readily inserted into the oil level gage guide 42 with a gap 166 between a sidewall 164 of the oil level gage guide 42 and the seal member 84. Referring to FIG. 12, the locking plug mechanism is illustrated in the expanded configuration with the width $W_2$ of the seal member 84 being expanded to engage the sidewall 164 of the oil level gage guide 42. In the expanded configuration, the seal member 84 engages the sidewall 164 thereby forming a seal there against and also resisting removal of the center pin member 80 and the seal member 84 from the oil level gage guide 42.

Figure 13:
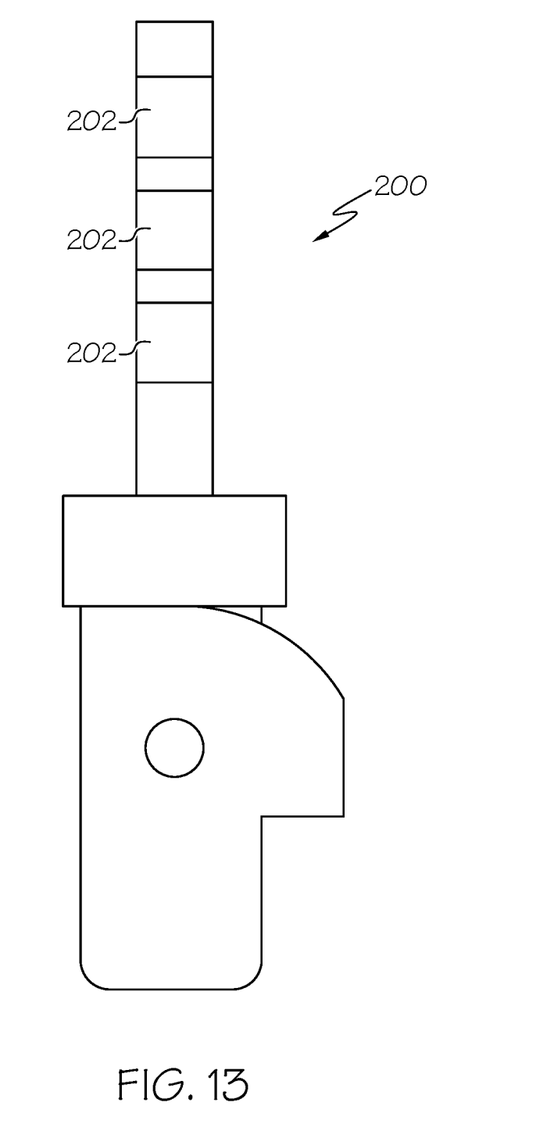
FIG. 13 illustrates another embodiment of a locking plug mechanism, according to one or more embodiments shown and described herein.

While a single seal member is discussed above, a locking plug mechanism 200 may include many of the features of the locking plug mechanism 60, except that multiple seal members 202 are used as shown by FIG. 13. The seal members 202 may be, for example, 0-ring-type seals having a collapsed configuration and an expanded configuration similar to the seal member 84.

The above-described locking plug mechanisms include a handle portion and an insertion portion that can be inserted into an oil level gage guide with the locking plug mechanism in a collapsed configuration. Once the insertion portion of the locking plug mechanism is inserted into the oil level gage guide, the handle portion may be actuated by a user to place the locking plug mechanism in an expanded configuration. The locking plug mechanism includes a center pin member and a seal member that is located on the center pin member. In the collapsed configuration, the seal member has a relatively smaller diameter to facilitate insertion into the oil level gage guide. Placing the locking plug mechanism in the expanded configuration shortens the length of the seal member, which causes the seal member to expand in diameter. The seal member expands in diameter to engage the sidewall of the oil level gage guide to fluidly seal the oil level gage guide from any pressure leakage.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A locking plug mechanism comprising:
   a handle assembly comprising a handle body that is pivotally connected to a handle attachment member;
   a center pin member that is connected to the handle attachment member, the center pin member slidably received within an opening of a proximal spacer member comprising a proximal spacer located proximally on the center pin member;
   a distal spacer located on the center pin member; and
   a seal member located on the center pin member between the proximal spacer and the distal spacer;
   wherein actuation of the handle assembly moves the center pin member relative to the proximal spacer and expands the seal member from a collapsed configuration to an expanded configuration, the seal member sized to be received within an oil dipstick tube in the collapsed configuration;
   wherein the seal member is sized to be received entirely within the oil dipstick tube at a location spaced from an upper rim of the oil dipstick tube.

2. The locking plug mechanism of claim 1, wherein the distal spacer is connected to a distal end of the center pin member.

3. The locking plug mechanism of claim 1, wherein the seal member engages both the proximal spacer and the distal spacer in the collapsed configuration.

4. The locking plug mechanism of claim 3, wherein a distance between the proximal spacer and the distal spacer decreases in the expanded configuration.

5. The locking plug mechanism of claim 1 comprising multiple seal members located on the center pin member.

6. The locking plug mechanism of claim 1, wherein the handle assembly comprises a handle member that is attached to the handle body.

7. The locking plug mechanism of claim 1, wherein the handle body comprises a pair of leg structures that are spaced apart to provide a channel that receives the handle attachment member.

8. The locking plug mechanism of claim 7, wherein the pair of leg portions has an opening aligned with an opening through the handle attachment member, the handle assembly comprising a center pin member that extends through the openings in the handle attachment member and pair of leg portions.

9. The locking plug mechanism of claim 8, wherein the pair of leg structures has an attachment body contact edge and a cam portion that provides a maximum distance from the attachment body contact edge to the opening in the pair of leg structures and a minimum distance from the attachment body contact edge to the opening in the pair of leg structures.

10. A method of sealing an oil dipstick tube using a locking plug mechanism during engine pressure testing, the method comprising:
    inserting a center pin member into the oil dipstick tube, the center pin member being slidably received within an opening of a proximal spacer member comprising a proximal spacer located proximally on the center pin member; and
    expanding a width of a seal member located on the center pin member between the proximal spacer and a distal spacer by actuating a handle assembly thereby moving the center pin member relative to the proximal spacer;
    wherein the seal member is sized to be received entirely within the oil dipstick tube at a location spaced from an upper rim of the oil dipstick tube.

11. The method of claim 10 further comprising collapsing the width of the seal member by actuating the handle assembly thereby moving the center pin member relative to the proximal spacer.

12. The method of claim 10, wherein the step of actuating the handle assembly moves the distal spacer closer to the proximal spacer thereby shortening a length of the seal member.

13. The method of claim 10 comprising multiple seal members located on the center pin member.

14. The method of claim 10, wherein the handle assembly comprises a handle member that is attached to the handle body.

15. The method of claim 10, wherein the handle body comprises a pair of leg structures that are spaced apart to provide a channel that receives a handle attachment member, the center pin member connected to the handle attachment member.

16. The method of claim 15, wherein the pair of leg portions has an opening aligned with an opening through the handle attachment member, the handle assembly comprising a center pin member that extends through the openings in the handle attachment member and pair of leg portions.

17. The method of claim 16, wherein the pair of leg structures has an attachment body contact edge and a cam portion that provides a maximum distance from the attachment body contact edge to the opening in the pair of leg structures and a minimum distance from the attachment body contact edge to the opening in the pair of leg structures.

18. A locking plug mechanism that seals an oil dipstick tube, the locking plug mechanism comprising:
- a handle assembly comprising a handle body that is pivotally connected to a handle attachment member;
- a center pin member that is connected to the handle attachment member, the center pin member slidably received within an opening of a proximal spacer member comprising a proximal spacer located proximally on the center pin member;
- a distal spacer located on the center pin member; and
- an expandable seal member located on the center pin member between the proximal spacer and the distal spacer, the seal member sized to be received within the oil dipstick tube in the collapsed configuration at a location spaced from an upper rim of the oil dipstick tube.

19. The locking pin mechanism of claim 18, wherein actuation of the handle assembly moves the center pin member relative to the proximal spacer and expands the seal member from the collapsed configuration to an expanded configuration.

\* \* \* \* \*